(12) United States Patent
Smith

(10) Patent No.: US 6,840,293 B1
(45) Date of Patent: Jan. 11, 2005

(54) LIQUID SPILL COLLECTOR ASSEMBLY

(76) Inventor: Philip E. Smith, 3732 Electro Way, Redding, CA (US) 96002

( * ) Notice: Subject to any disclaimer, the term of this patent is extended or adjusted under 35 U.S.C. 154(b) by 0 days.

(21) Appl. No.: 10/702,867

(22) Filed: Nov. 6, 2003

(51) Int. Cl.[7] .............................. B65B 1/04; F16K 23/00

(52) U.S. Cl. .............................. 141/86; 141/97; 141/98; 137/312

(58) Field of Search .............................. 141/86, 97, 98; 137/312, 313; 222/108, 111

(56) References Cited

U.S. PATENT DOCUMENTS

| 4,696,330 A | 9/1987 | Raudman |
| 5,954,103 A | * 9/1999 | Smith .......................... 141/86 |

* cited by examiner

Primary Examiner—Timothy L. Maust
(74) Attorney, Agent, or Firm—Thomas R. Lampe

(57) ABSTRACT

A liquid spill collector assembly is connected to a riser leading to an underground liquid storage tank and includes a collector container connected to the riser and a second or auxilliary collector container expanding storage capacity of the assembly which is connected to the top of the first collector container. The assembly also includes a platform for supporting an individual to facilitate access to the collector containers.

12 Claims, 3 Drawing Sheets

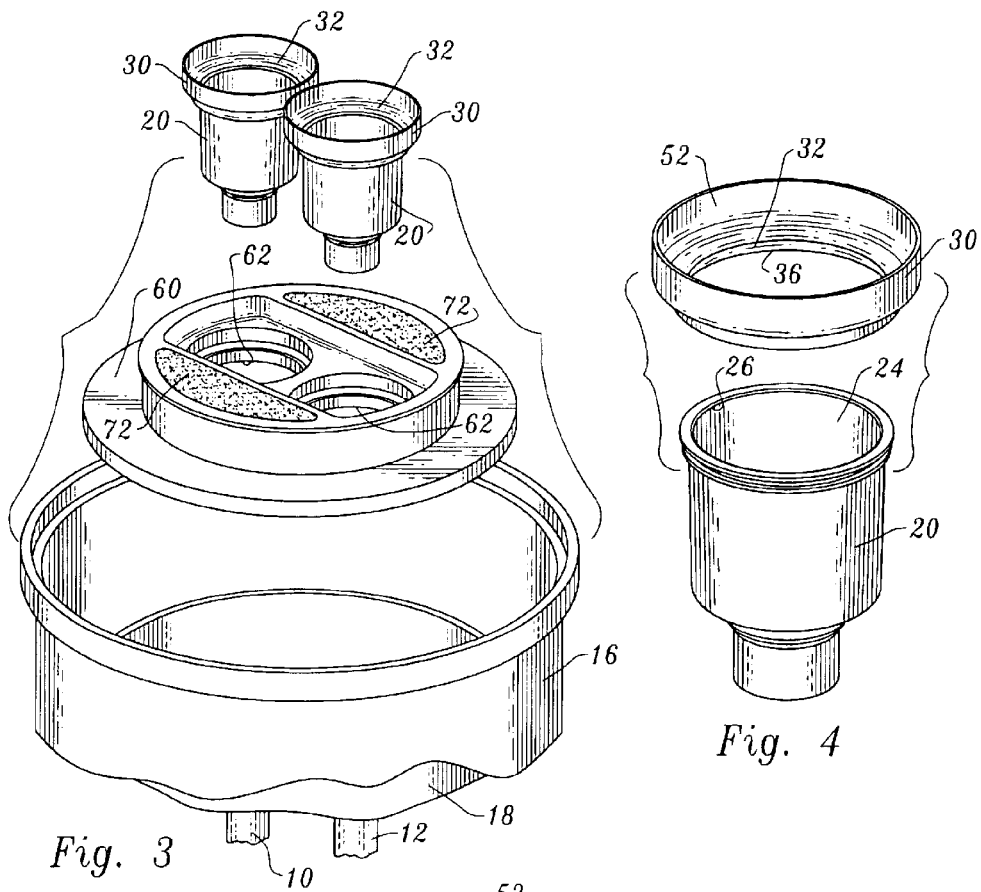
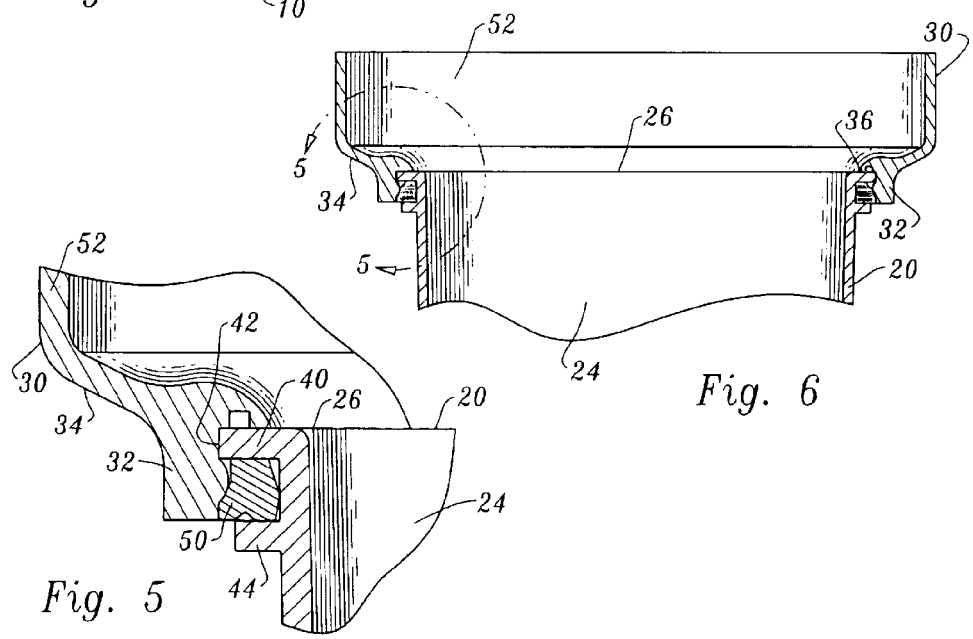
Fig. 3
Fig. 4
Fig. 5
Fig. 6

LIQUID SPILL COLLECTOR ASSEMBLY

TECHNICAL FIELD

This invention relates to a liquid spill collector assembly connected to a riser extending upwardly from an underground liquid storage tank. The assembly has particular application to pipes associated with underground storage tanks employed to store gasoline or other liquid fuels.

BACKGROUND OF THE INVENTION

It is well known to employ collector receptacles or containers to collect spillage about the inlet pipe or riser of a storage tank. Arrangements are provided in the prior art for selectively permitting the spillage to flow into the tank through one or more valved passages in the receptacle. U.S. Pat. No. 4,696,330, issued Sep. 29, 1987, discloses such an arrangement.

Occasionally, the containers or buckets do not have sufficient capacity to accommodate a large spill. Furthermore, some prior art spill collection devices are also difficult to manually access.

DISCLOSURE OF INVENTION

The apparatus of the present invention allows the capacity of a liquid spill collector assembly to be increased simply and inexpensively. In addition, the invention incorporates a feature which facilitates access to the collector container and riser associated therewith by an individual.

The liquid spill collector assembly of the present invention is connected to a riser extending upwardly from an underground liquid storage tank, the riser having an upper riser end and defining a riser interior leading to the storage tank.

The liquid spill collector assembly includes a first collector container connected to the riser and extending upwardly from the upper riser end. The first collector container includes a first collector container outer peripheral wall and defines a first collector container interior. The first collector container also has a first collector container upper end defining an upper first collector container opening communicating with the first collector container interior.

A second collector container is secured to the first collector container and defines a second collector container interior communicating with the first collector container interior for receiving liquid spillage and adding to the liquid spillage capacity of the first collector container.

The invention also comprises a platform having an opening receiving the second collector container. The platform surrounds the second collector container and provides support for an individual accessing the second collector container.

Other features, advantages and objects of the present invention will become apparent with reference to the following description and accompanying drawings.

BRIEF DESCRIPTION OF DRAWINGS

FIG. 3 is an exploded, perspective view illustrating components of the assembly prior to their insertion into the open topped housing and operative engagement with the risers;

FIG. 4 is a perspective, exploded view illustrating a first collector container prior to attachment thereto of a second or auxilliary collector container;

FIG. 5 is a greatly enlarged cross-sectional view of those portions of the first and second collector containers delineated by double-headed arrow 5—5 in FIG. 6;

FIG. 6 is an enlarged, cross-sectional view showing the second or auxilliary collector container releasably connected to the first collector container, a portion of the latter being shown;

BEST MODE FOR CARRYING OUT THE INVENTION

Figure 1:
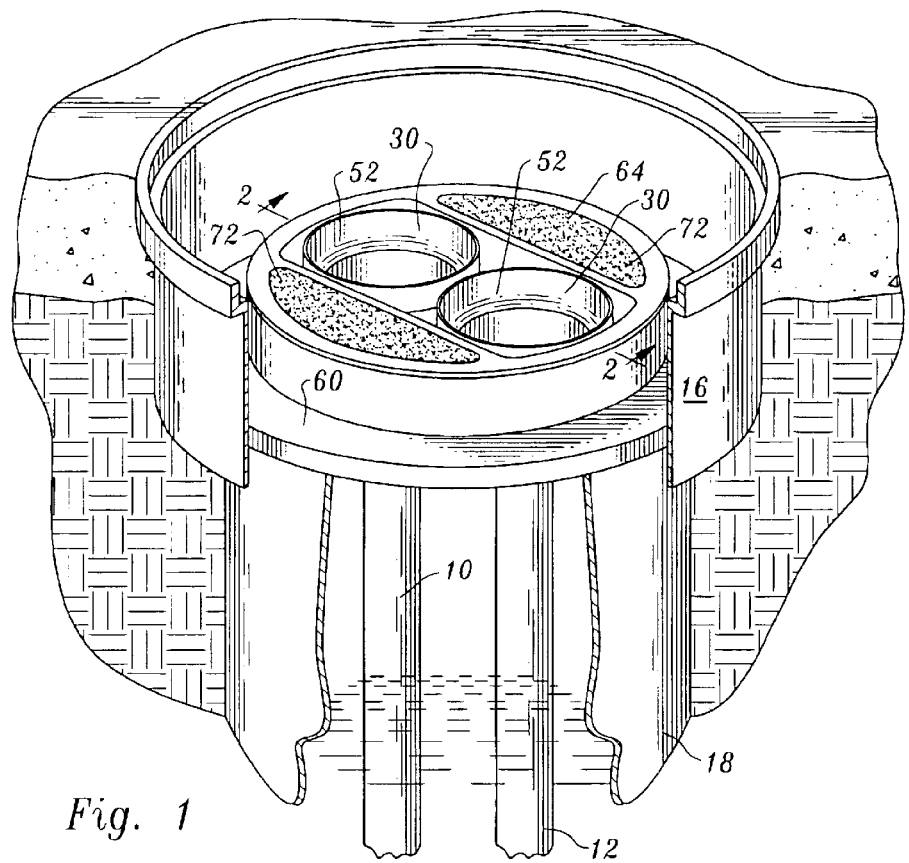
FIG. 1 is a perspective view illustrating the collector assembly of the present invention employed with two risers extending upwardly from an underground liquid storage tank, the assembly being disposed within the confines of an open topped housing disposed in the ground above the tank.
Figure 2:
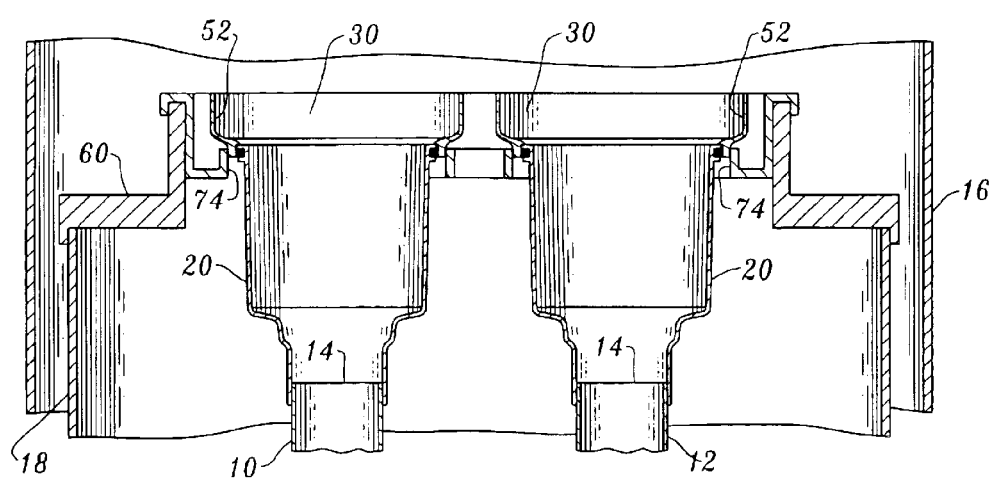
FIG. 2 is an enlarged, cross-sectional view taken along the line 2—2 in FIG. 1.
Figure 7:
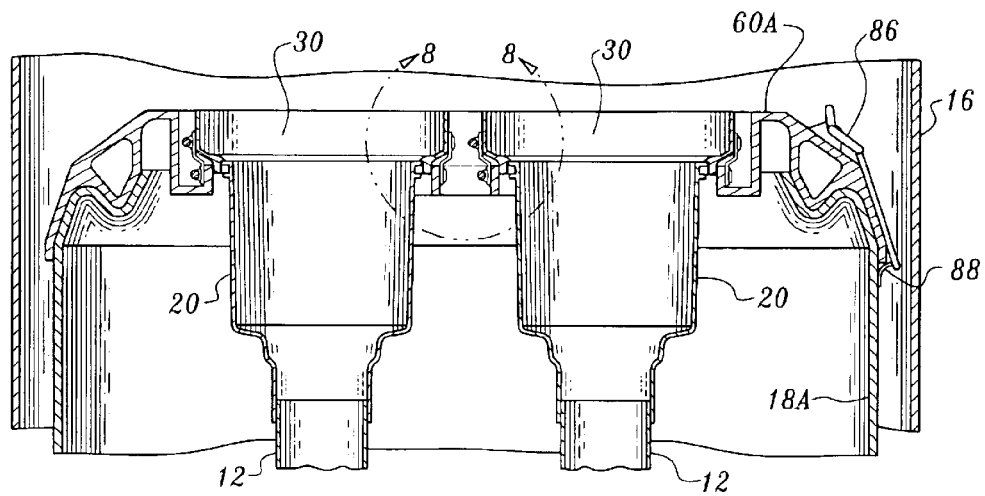
FIG. 7 is a view similar to FIG. 2 showing an alternative embodiment of the invention.
Figure 8:
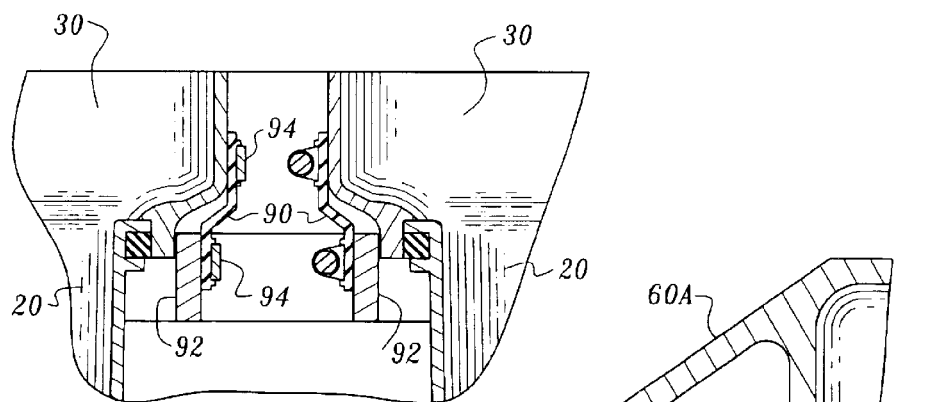
FIG. 8 is a greatly enlarged cross-sectional view of that portion of the alternative embodiment delineated by double arrow headed line 8—8 in FIG. 7.

FIGS. 1–6 illustrate one embodiment of the invention. Referring to FIG. 1, two tank risers 10, 12 extend upwardly from a conventional underground storage tank (not shown) holding a liquid, such as gasoline. The lower ends of the risers or pipes communicate with the interior of the tank. Although a two riser system is illustrated, it will be appreciated that the principles of the present invention are applicable to situations wherein only a single riser or more than two risers are associated with the underground storage tank.

The risers 12 have open upper riser ends 14 which terminate in an open topped housing 16 in the form of a multi-port lid receptacle positioned in the ground above the tank. A sump riser 18 is also positioned in the ground, the upper end thereof below ground level. The sump riser is surrounded by lid receptacle 16 and spaced therefrom. In the interest of simplicity the lid normally held by lid receptacle 16 is not shown.

Positioned on and connected to the upper riser ends 14 are collector containers, receptacles or buckets 20 which in the disclosed arrangement are of identical construction, one of the buckets being, for example, a vapor bucket and the other a spill bucket. Reference may now be had to all of the FIGS. 1–6 for details concerning the containers 20 and associated structure forming part of the liquid spill collector assembly of the present invention.

Each collector container or bucket 20 extends upwardly from its associated upper riser end. Each collector container 20 includes a collector container outer peripheral wall and defines a collector container interior 24. Each collector container 20 has a collector container upper end defining a collector container opening 26 communicating with the collector container interior 24. Each collector container 20 is also open at the bottom thereof to allow communication between the interior 24 of the collector container and its associated tank riser.

As indicated above, it is common practice to provide a mechanism within collector containers employed in fuel spillage collection systems including a manually actuable valve arrangement to either interrupt communication between the collector container and the riser interior or provide communication therebetween, the latter allowing any fuel collected in the collector container to drain into the tank through the riser. In the interest of simplicity and since such mechanism constitutes no part of the present invention, it has not been illustrated. However, reference may be had to the aforementioned U.S. Pat. No. 4,696,330 for an example of such an arrangement.

It will be appreciated that when communication between the collector container interior 24 and the interior of its associated tank riser is interrupted, gasoline or other liquid spillage will be collected within the collector container. If the spillage exceeds the capacity of the collector container, overflow will occur with the excess fuel escaping into the surrounding area, potentially causing harm to the environment.

To add to the liquid spillage capacity of the liquid spill collector assembly, the assembly includes a second or auxilliary collector container 30 secured to each collector container 20.

Each second or auxilliary collector container 30 defines an interior 32 communicating with the collector container interior 24 of its associated collector container 20. This is for the purpose of receiving liquid spillage and adding to the liquid spillage capacity provided by the first or primary collector container 20. Each collector container 20 has connector structure located at the upper end thereof which is cooperable with connector structure located at the lower end of the second collector container 30 to maintain the collector containers 20, 30 attached.

More particularly, the connector structure of auxiliary collector container 30 comprises a downwardly extending, circular-shaped flange 32 projecting downwardly from the bottom 34 thereof. The bottom 34 defines an opening 36 therein in communication with collector container opening 26 of collector container 20 and the flange 32 surrounds opening 36.

The connector structure of each collector container 20 is in the form of a radially outwardly projecting flange 40 located at the upper end of collector container 20. The flange 40 surrounds opening 26.

Flange 32 of the second or auxilliary collector container 30 defines a circular-shaped indent 42 and the flange 40 of the collector container 20 is maintained in the circular-shaped indent 42 and in locking engagement with the downwardly extending, circular-shaped flange 32. It will be appreciated that the flange 32 has some degree of flexibility, enabling the collector container 30 to be readily snapped in place to be continuously biased in locking engagement with flange 40. For example, the second or auxilliary collector container 30 may be integrally formed of plastic having a desired degree of resilience and flexibility.

A circular-shaped seal 50 is located in a channel defined by flange 40 and a secondary flange 44 of each collector container 20. The seals 50 are located between and in compressed engagement with the collector containers 20 and their associated auxiliary collector containers 30 to maintain a fluid-tight seal therebetween.

The outer peripheral wall 52 of each collector container 30 has a circumference larger than the circumference of the collector container outer peripheral wall 22. The bottom 34 of collector container 30 radiates outwardly away from the opening 36 to the peripheral wall 52, the bottom 34 having an upper surface inclined toward the opening 36 as well as the opening 26 of collector container 20.

An additional component of the liquid spill collector assembly of the present invention is a sump reducer or platform 60, preferably integrally formed of a suitable material such as plastic or metal. The platform 60 defines two openings 62, each one of which receives a collector container 20. The platform surrounds each collector container 20 and provides support for an individual accessing the collector containers and risers associated therewith.

The platform 60 is positioned on the top of sump riser 18 and is preferably fixedly attached thereto. The platform has an upper platform portion 64 adjacent to the openings 62. The upper platform portion is of a size and configuration enabling the platform to fit within the confines of housing 16 and surround the collector containers.

In the arrangement illustrated in FIGS. 1–6, the upper platform portion includes two upper foot engagement surfaces 72 disposed at opposed sides of the openings 62. The collector containers engage circular stabilizer surfaces 74 of the platform adjacent to openings 62 to stabilize the collector containers.

Figure 10:
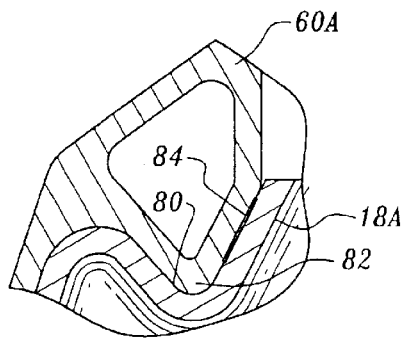
FIG. 10 illustrates the structural elements of FIG. 9 engaged and with a seal element compressed therebetween.
Figure 9:
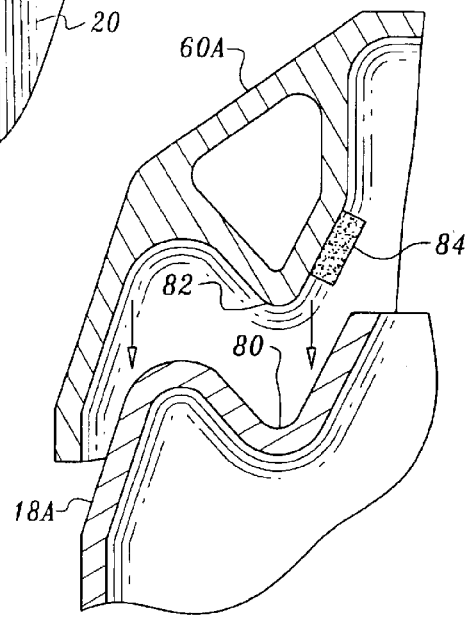
FIG. 9 is a greatly enlarged view of portions of selected structural elements of the apparatus of FIG. 7 prior to engagement therebetween.

FIGS. 7–10 illustrate a second embodiment of the invention. In this arrangement, the sump riser 18A is shaped and curved at the upper end thereof to form a circular recess 80. Recess 80 receives downwardly extending, circular rib 82 formed on platform 60A conforming to the shape of the recess 80. A seal 84 formed of any suitable material such as foam plastic extending completely about the inner periphery of the rib is compressed (as shown in FIG. 10) when the rib is seated in the recess to form a fluid-tight seal between the sump riser 18A and the platform 60A.

Locks 86 (only one of which is illustrated) of any suitable nature, such as over center latches of well known construction, are disposed at spaced locations about the outer periphery of platform 60A to selectively lockingly engage corresponding projections 88 (only one of which is illustrated) on the sump riser 18A to clamp the platform and riser together.

Band shaped sealing rings 90, formed of any suitable material such as rubber or plastic, engage and extend about the outer surfaces of auxilliary collector containers 30 and flanges 92 of the platform 60A associated therewith. Flexible metal bands 94 are used to maintain fluid-tight engagement between the sealing rings and the auxilliary collector containers and associated flanges 92. Tightening screws 96 of a conventional nature are associated with the bands 94 to tighten the sealing rings 90.

What is claimed is:

1. A liquid spill collector assembly connected to a riser extending upwardly from an underground liquid storage tank, said riser having an upper riser end and defining a riser interior leading to said storage tank, said liquid spill collector assembly comprising, in combination:

a first collector container connected to the riser and extending upwardly from said upper riser end, said first collector container including a first collector container outer peripheral wall and defining a first collector container interior, and said first collector container having a first collector container upper end defining an upper first collector container opening communicating with said first collector container interior;

a second collector container secured to said first collector container and defining a second collector container interior communicating with said first collector container interior for receiving liquid spillage and adding to the liquid spillage capacity of said first collector container;

a platform defining an opening receiving said second collector container, said platform surrounding said second collector container and providing support for an individual accessing said second collector container; and a fluid-tight seal extending between said platform and said second collector container.

2. A liquid spill collector assembly connected to a riser extending upwardly from an underground liquid storage tank, said riser having an upper riser end and defining a riser interior leading to said storage tank, said liquid spill collector assembly comprising, in combination:

a first collector container connected to the riser and extending upwardly from said upper riser end, said first collector container including a first collector container outer peripheral wall and defining a first collector container interior, and said first collector container having a first collector container upper end defining an upper first collector container opening communicating with said first collector container interior;

a second collector container secured to said first collector container and defining a second collector container interior communicating with said first collector container interior for receiving liquid spillage and adding to the liquid spillage capacity of said first collector container;

a platform defining an opening receiving said second collector container, said platform surrounding said second collector container and providing support for an individual accessing said second collector container; and said platform positionable on a sump riser including a sump riser engagement surface, said liquid spill collector assembly additionally comprising a seal connected to said sump riser engagement surface.

3. A liquid spill collector assembly connected to a riser extending upwardly from an underground liquid storage tank, said riser having an upper riser end, and defining a riser interior leading to said storage tank, said liquid spill collector assembly comprising, in combination:

a first collector container connected to the riser and extending upwardly from said upper riser end, said first collector container including a first collector container outer peripheral wall and defining a first collector container interior, and said first collector container having a first collector container upper end defining an upper first collector container opening communicating with said first collector container interior; and a second collector container secured to said first collector container and defining a second collector container interior communicating with said first collector container interior for receiving liquid spillage and adding to the liquid spillage capacity of said first collector container, said first collector container having first collector container connector structure located at said first collector container upper end and said second collector container having a second collector container lower end and second collector container connector structure located at said second collector container lower end, said first collector container connector structure and said second collector container connector structure being attached, said second collector container having a second collector container bottom defining a second collector container opening in communication with the upper first collector container opening, said first collector container connector structure surrounding said upper first collector container opening and said second collector container connector structure surrounding said second collector container opening, said second collector container connector comprising a downwardly extending, circular-shaped flange projecting downwardly from said second collector container bottom defining a circular-shaped indent and said first collector container connector structure comprising a radially outwardly projecting flange located at said first collector container upper end, said radially outwardly projecting flange being maintained in said circular-shared indent and in engagement with said downwardly extending circular-shaped flange.

4. The liquid spill collector assembly according to claim 3 additionally including a circular seal located between and in compressed engagement with said first collector container and said second collector container to maintain a substantially fluid-tight seal therebetween.

5. The liquid spill collector assembly according to claim 3 wherein said first collector container has a first collector container peripheral wall and wherein said second collector container has a second collector container peripheral wall, said second collector container peripheral wall having a circumference larger than the circumference of said first collector container peripheral wall, and said second collector container bottom radiating outwardly away from said second collector container opening to said second collector container peripheral wall.

6. The liquid spill collector assembly according to claim 5 wherein said second collector container bottom has an upper surface inclined toward said second collector container opening and said upper first collector container opening.

7. The liquid spill collector assembly according to claim 3 wherein said downwardly extending circular-shaped flange is flexible and continuously biased into communication with said radiating outwardly projecting flange.

8. An auxiliary collector container for use in a liquid spill assembly connected to a riser extending upwardly from an underground liquid storage tank, said riser having an upper riser end and defining a riser interior leading to said storage tank, said liquid spill collector assembly including a first collector container connected to the riser and extending upwardly from said upper riser end, said first collector container including a first collector container outer peripheral wall and defining a first collector container interior, and said first collector container having a first collector container upper end defining an upper first collector container opening communicating with said first collector container interior, said auxiliary collector container including connector structure for securing the auxiliary collector container to the first collector container, said auxiliary collector container defining an auxiliary collector container interior communicating with said first collector container interior when the auxiliary collector container is secured to the first collector container for receiving liquid spillage and adding to the liquid spillage capacity of said first collector container, said auxilliary collector container including an auxilliary collector container bottom defining an auxilliary collector container opening in communication with the upper first collector container opening when the auxilliary collector container is secured to the first collector container, said releasable connector structure comprising a downwardly extending circular-shaped flange projecting downwardly from said auxilliary collector container bottom defining a circular-shaped indent for receiving a radially outwardly projecting flange located at the first collector container upper end.

9. The auxilliary collector container according to claim 8 additionally including a circular seal located under said collector container bottom for compressive engagement with said first collector container to provide a substantially fluid-tight seal therewith.

10. The auxilliary collector container according to claim 8 including an auxilliary collector container peripheral wall, said auxilliary collector container peripheral wall having a circumference larger than the circumference of an outer peripheral wall of said first collector container, said auxilliary collector container bottom radiating outwardly away from said auxilliary collector container opening to said auxilliary collector container peripheral wall.

11. The auxilliary collector container according to claim 10 wherein said auxilliary collector container bottom has an upper surface inclined toward said auxilliary collector container opening.

12. The auxilliary collector container according to claim 8 wherein said downwardly extending circular-shaped flange is flexible.

* * * * *